(12) United States Patent
Zhang et al.

(10) Patent No.: US 9,749,250 B2
(45) Date of Patent: Aug. 29, 2017

(54) METHODS FOR ADJUSTING NETWORK TRANSMISSION SERVICE LEVEL AND DATA TERMINALS

(71) Applicant: Shenzhen Mindray Bio-Medical Electronics Co., Ltd., Shenzhen (CN)

(72) Inventors: Zhenqi Zhang, Shenzhen (CN); Saixin Zhou, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 157 days.

(21) Appl. No.: 14/297,459

(22) Filed: Jun. 5, 2014

(65) Prior Publication Data
US 2014/0286160 A1 Sep. 25, 2014

Related U.S. Application Data

(63) Continuation-in-part of application No. PCT/CN2012/085796, filed on Dec. 4, 2012.

(30) Foreign Application Priority Data

Dec. 5, 2011 (CN) .......................... 2011 1 0398723

(51) Int. Cl.
*H04L 12/833* (2013.01)
*H04L 29/08* (2006.01)
*H04L 12/851* (2013.01)

(52) U.S. Cl.
CPC .......... *H04L 47/2458* (2013.01); *H04L 47/24* (2013.01); *H04L 47/2433* (2013.01); *H04L 67/14* (2013.01); *H04L 47/2408* (2013.01)

(58) Field of Classification Search
CPC . H04L 12/5693; H04L 47/24; H04L 47/2408; H04L 47/2416; H04L 47/2425;
(Continued)

(56) References Cited

U.S. PATENT DOCUMENTS

| 5,748,629 A * | 5/1998 | Caldara ............. G06F 15/17375 370/389 |
| 2008/0095055 A1 * | 4/2008 | Moulsley ............ H04L 12/5693 370/234 |

(Continued)

FOREIGN PATENT DOCUMENTS

| CN | 1627785 A | 6/2005 |
| CN | 1688178 A | 10/2005 |

(Continued)

OTHER PUBLICATIONS

Chen et. al, "Transmission of Patient Vital Signs Using Wireless Body Area Networks", Mobile Network Application, Springer Science+Business Media, LLC, Jul. 6, 2010.*

*Primary Examiner* — Khoa Huynh
(74) *Attorney, Agent, or Firm* — Kory D. Christensen; Polsinelli LLP (57) ABSTRACT

This disclosure relates to methods for adjusting network transmission service levels, data terminals, and network servers. The method for adjusting a network transmission service level, used in a data terminal, comprises: obtaining data to be transmitted; inserting the data into specified queues or assigning priorities to the data according to one or more data characteristics selected from importance, instantaneity, data resources, and data types; transmitting a transmission service request to a network server, wherein the transmission service request includes information about the network transmission service level requested and corresponding network configuration parameters; and using the network transmission service provided by the network server according to the transmission service request to transmit the data in queues or the data whose priorities correspond to the network transmission service level provided. The data terminal could ask the network transmission
(Continued)

service provider to provide different network transmission service to improve the instantaneity and stability of data transmission.

14 Claims, 4 Drawing Sheets

(58) Field of Classification Search
CPC .. H04L 47/2433; H04L 47/2458; H04L 67/14
See application file for complete search history.

(56) References Cited

U.S. PATENT DOCUMENTS

| | | | |
|---|---|---|---|
| 2008/0274729 A1* | 11/2008 | Kim | H04W 28/24 455/423 |
| 2010/0278156 A1* | 11/2010 | Shin | H04W 48/08 370/337 |
| 2012/0082036 A1* | 4/2012 | Abedi | G06F 19/3418 370/241 |

FOREIGN PATENT DOCUMENTS

| | | | | |
|---|---|---|---|---|
| CN | 101527682 A | 9/2009 | | |
| JP | WO 0232161 A2 * | 4/2002 | ............ | H04L 12/14 |
| WO | WO2010110710 A1 | 9/2010 | | |

\* cited by examiner

METHODS FOR ADJUSTING NETWORK TRANSMISSION SERVICE LEVEL AND DATA TERMINALS

TECHNICAL FIELD

This disclosure relates to methods for adjusting network transmission service levels and data terminals.

SUMMARY

Disclosed herein are embodiments of methods for adjusting network transmission service levels and data terminals.

In one aspect, a method for adjusting a network transmission service level, used in a data terminal, comprises:

obtaining data to be transmitted;

inserting the data into specified queues or assigning priorities to the data according to one or more data characteristics selected from importance, instantaneity, data resources, and data types;

transmitting a transmission service request to a network server, wherein the transmission service request includes information about the network transmission service level requested and corresponding network configuration parameters; and using the network transmission service provided by the network server according to the transmission service request to transmit the data in queues or the data whose priorities correspond to the network transmission service level provided.

In another aspect, a data terminal comprises:

a data pretreating unit for inserting data to be transmitted into specified queues or assigning priorities to the data according to one or more data characteristics selected from importance, instantaneity, data resources, and data types;

a transmission service requesting unit for transmitting a transmission service request to a network server, wherein the transmission service request includes information about the network transmission service level requested and corresponding network configuration parameters; and a data transmitting unit for using the network transmission service provided by the network server according to the transmission service request to transmit the data in queues or the data whose priorities correspond to the network transmission service level provided.

In still another aspect, a data terminal comprises:

a data obtaining module for obtaining data to be transmitted;

a storage module for storing the data to be transmitted and a mapping table representing the relationship between the data and network transmission service levels;

an input device for outputting a transmission service changing request according to operation of an operator, wherein the transmission service changing request includes information about the network transmission service level selected and corresponding network configuration parameters; and at least one processor connecting with the data obtaining module, the storage module, and the input device for generating a transmission service request according to a default network transmission service level or the transmission service changing request received, and determining the data to be transmitted according to the transmission service changing request received and the mapping table.

DETAILED DESCRIPTION

In order to monitor and treat a patient who needs emergency treatment as early as possible, some prehospital emergency systems are provided. Usually, the prehospital emergency system includes an emergency end and a hospital end. The emergency end, set in an ambulance or a rescue site, may include some devices with monitoring and emergency functions used to get physiological parameters of the patient and provide necessary treatment earlier. Data obtained by the emergency end of the prehospital emergency system gives a good reference to hospital treatment. So prehospital emergency care is an important part of the emergency medical care, and monitoring or diagnostic data obtained during the prehospital phase is very important. In order to guarantee quality of emergency rescue to aid in prehospital care and subsequent hospital care, real-time patient data obtained by the emergency end is transmitted to the hospital in time so that experts in the hospital can provide diagnosis and guidance in advance. This can also save time for diagnosing after the patient arrives at the hospital, and it becomes an inevitable trend of prehospital emergency medical care system development.

But the emergency ends of existing systems do not transmit data to the hospital in time. The data obtained by the emergency end includes various vital signs, reports, and treatment data, and it may also include live audio and video data and ambulance GPS data. Most of these data are real-time waveform data or image data, and the bandwidth of wireless or wired networks provided by existing network server providers is fixed, so the data obtained by the emergency end cannot be transmitted to the hospital in time or even can be lost due to network congestion, and the real-time waveform may not be displayed in the hospital in time.

The inventive conception of this disclosure is requesting different network transmission service levels to transmit different data according to one or more data characteristics selected from importance, instantaneity, data resources, and data types. If the data transmitted is more important, more instantaneous, or larger in amount, the network transmission service level requested is higher, the transmission service quality and transmission speed of the network transmission service provided by the network transmission service provider is higher, and the delay is smaller. In one embodiment, the data transmitted is inserted into one or more data characteristics selected from importance, instantaneity, data resources, and data types, and the data with the same priority can be added into a same queue or different queues. There is a mapping table which represents mapping relationships between the network transmission service levels and the queues, and a certain network transmission service level could correspond to one queue or multiple queues. In another embodiment, the data transmitted is assigned a priority according to one or more data characteristics selected from importance, instantaneity, data resources, and data types, and a mapping table is used to represent mapping relationships between the network transmission service levels and the priorities of the data. A certain network transmission service level could correspond to one priority or multiple priorities of the data.

In the following embodiments, a medical device referred to as a data terminal may be a patient monitor, a defibrillator, a respirator, or an electrocardiograph. The medical device used in the prehospital emergency system is at the emergency end and transmits the data obtained to the hospital end via wireless or wired networks.

First Embodiment

Figure 1:
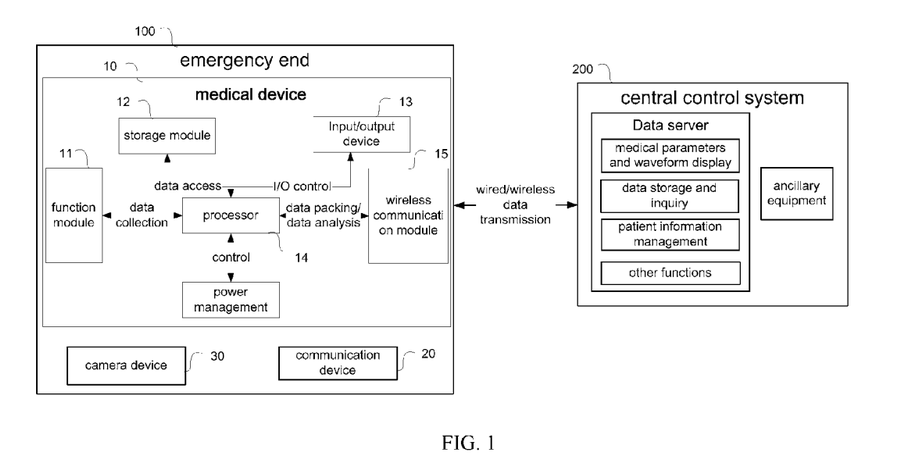
FIG. 1 shows a schematic diagram of a prehospital emergency system according to an embodiment.

As shown in FIG. 1, the prehospital emergency system may include an emergency end 100 and a central control system 200. The emergency end 100 may include a medical device 10, a communication device 20, and a camera device 30.

The medical device 10 refers to all kinds of emergency devices used outside a hospital, including but not limited to a patient monitor, defibrillator, electrocardiograph, and respirator. The medical device 10 might include but is not limited to a control system, a storage module, a function module, an output module, a wireless communication module, and a power management module. The wireless communication module could be integrated into the medical device or be a separate hardware module.

The communication device 20 refers to a data receiving and sending device, which could be installed in the ambulance or other emergency equipment.

The camera device 30 refers to an audio and video obtaining device.

The data of the emergency end could be divided into three categories according to their sources:

1. vital signs and treatment data including but not limited to parameters, waveforms, 12-lead ECG reports, trends and events reflecting patient vital signs (such as ECG, SPO2, NIBP, IBP, TEMP, or CO2), and operation and treatment events implemented by rescuers. In addition, the vital signs and treatment data could also include received network task instructions, which mainly refer to instruction events sent from the hospital.

2. machine data including but not limited to alarm information, user information, software and/or hardware state information, and system configuration information. In addition, the machine data could also include task instructions, system configurations, and system software received through a network and/or data obtained by other devices, such as GPS.

3. audio and video data including audio and video information obtained by devices such as the emergency device and affiliate camera.

The emergency end uploads at least part of the obtained medical data (including physiological parameters reflecting the patient vital signs, medical reports, treatment data, events, machine data, and so on) and/or patient field data (including audio and video data, GPS data of the ambulance, text descriptions, and so on) to the central control system 200 by wireless or wired network. The central control system 200 may include one or more data servers. A data server could include one or more management systems or software to realize data analysis, management, or controlment.

In the embodiment of FIG. 1, the medical device 10 includes a data obtaining module (not shown), a storage module 12, an input/output device 13, and a processor 14. The data obtaining module obtains data that needs to be transmitted, and may include a function module 11 for obtaining physiological parameters representing patient vital signs. In another embodiment, the data obtaining module may also include an interface (not shown in the figures) for receiving video and audio data obtained by the camera device 30. Data obtained by the data obtaining module is processed by the processor 14 and then stored in the storage module 12. The storage module 12 also stores a preset mapping table which represents the mapping relationship between the network transmission service levels and the priorities of data to be transmitted. The input/output device 13 may include an input device and an output device. The input device outputs transmission service changing requests according to operation of an operator, and a transmission service changing request could include information about the network transmission service level selected and corresponding network configuration parameters. The processor 14, which connects with the data obtaining module, the storage module 12, and the input/output device 13, processes data obtained from the data obtaining module or the storage module 12 and then transmits processed data to the communication device 20. The communication device 20 transmits the processed data to a remote receiver, such as the central control system 200, by wired or wireless network.

In an embodiment, the medical device 10 may also include a wireless communication module 15. The processor 14 transmits the data to be sent to the remote receiver to the communication device 20 through the wireless communication module 15, and then the communication device 20 transmits the data to the remote receiver by wired or wireless network.

In an embodiment, the processor 14 may also receive transmission service changing requests sent by the input device 13. The processor 14 generates a transmission service request according to the default network transmission service level or the transmission service changing request received, and then determines the data to be transmitted according to the network transmission service level of the transmission service request and the mapping table. The transmission service changing request can be generated at the beginning of data transmission or during subsequent transmission according to the operation of the medical worker.

In a specific embodiment, the input device 13 could be realized by multiple buttons, a knob with multiple statuses, or a toggle button with multiple statuses. The input device 13 could also be realized by soft keys, such as icons, option widgets, and input widgets, set on the display interface, with each soft key representing one network transmission service level. The buttons, knob, or toggle button could be set on an operation panel to facilitate operation by the medical worker.

In the embodiment, the data transmission sequence is determined based on its source or type.

Figure 2:
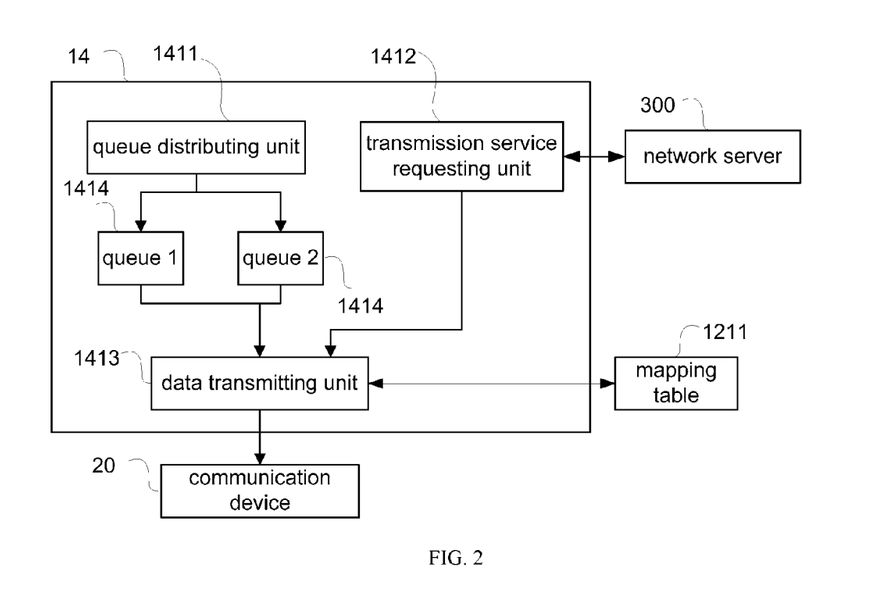
FIG. 2 shows a schematic diagram of a processor according to an embodiment.

In a specific embodiment, as shown in FIG. 2, the processor 14 may include a queue distributing unit 1411, a transmission service requesting unit 1412, and a data transmitting unit 1413. The queue distributing unit 1411 inserts the data to be transmitted into one or more queues 1414 according to source or type. In this embodiment, each queue 1414 is assigned a priority in advance, and the data in a queue 1414 will be transmitted by the priority of the queue 1414. The transmission service requesting unit 1412 transmits a transmission service request, which could include the network transmission service level requested and corresponding network configuration parameters, to a network server 300. The data transmitting unit 1413 uses the network transmission service provided by the network server 300 to transmit data in queues 1414 corresponding to the network transmission service level of the network transmission service provided. For example, the data transmitting unit 1413 transmits data in corresponding queues 1414 to the communication device 20, and then the communication device 20 transmits the data to the remote receiver.

The data to be transmitted could be obtained from a mapping table 1211 according to the network transmission service level provided. For example, the mapping table 1211, which represents the mapping relationship between the network transmission service levels and the queues 1414, could be stored in the storage module in advance, and each network transmission service level could correspond to one or more queues 1414. When data needs to be transmitted, the data transmitting unit 1413 queries the mapping table 1211 in the storage module to determine corresponding queues 1414, then polls for corresponding queues 1414 and transmits data in the queues 1414.

Figure 3:
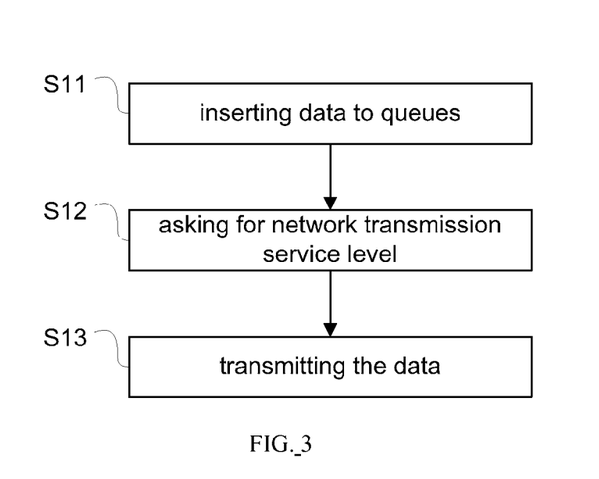
FIG. 3 shows a flow chart of a method for adjusting network transmission service level according to an embodiment.

Based on the structure of the specific embodiment, the network transmission service level could be adjusted as needed during data transmission. As shown in FIG. 3, a method for adjusting the network transmission service level could include the following steps.

At step S11, the processor of the medical device obtains data to be transmitted and inserts the data into one or more queues according to resources and types. In one specific embodiment, the obtained data could include at least one of vital signs, treatment data, events, machine data, patient reports, analysis reports, audio and video data, and on-site consultation obtained in real time. Each queue is assigned a priority, and data in the queue with the highest priority is transmitted no matter what the network transmission service level is. Specifically, the data are divided into two types: (1) the vital signs and treatment data, which need to be transmitted in time, belong to one category and are inserted into the queue with the highest priority; and (2) the audio and video data and images, which need to be transmitted in special or emergency circumstances, belong to another category and are inserted into the queue with lower priority. The audio and video data and images are transmitted only when the network transmission service level provided is high enough, thus ensuring the important data will be transmitted to the central control system in time and avoiding network congestion caused by the large volume of transmitted data.

At step S12, a transmission service request, which could include information about the network transmission service level requested and corresponding network configuration parameters, is transmitted to the network server. If the network transmission service level requested is higher, the transmission service quality of the network transmission service provided by the network transmission service provider is higher, and the amount of data transmitted is larger. For example, if the medical device requests a higher network transmission service level, the network transmission service provider provides wider bandwidth, shorter transmission delay, and better transmission channels (such as a better transmission network or fewer notes).

At step S13, the data in queues corresponding to the network transmission service level provided are transmitted through the network transmission service provided by the network server. The network transmission service may include at least one of bandwidth, transmission delay, and transmission channels. For example, the network server could provide a private network or increase network bandwidth according to the network transmission service level requested by the data terminal. In an embodiment, the processor of the medical device polls for queues corresponding to the network transmission service level provided and uploads data from these queues, or the processor uploads the data by timing; that is, the processor reads and uploads data from a queue corresponding to the network transmission service level during a certain time, and reads and uploads data from another queue corresponding to the network transmission service level during another time.

Second Embodiment

Figure 4:
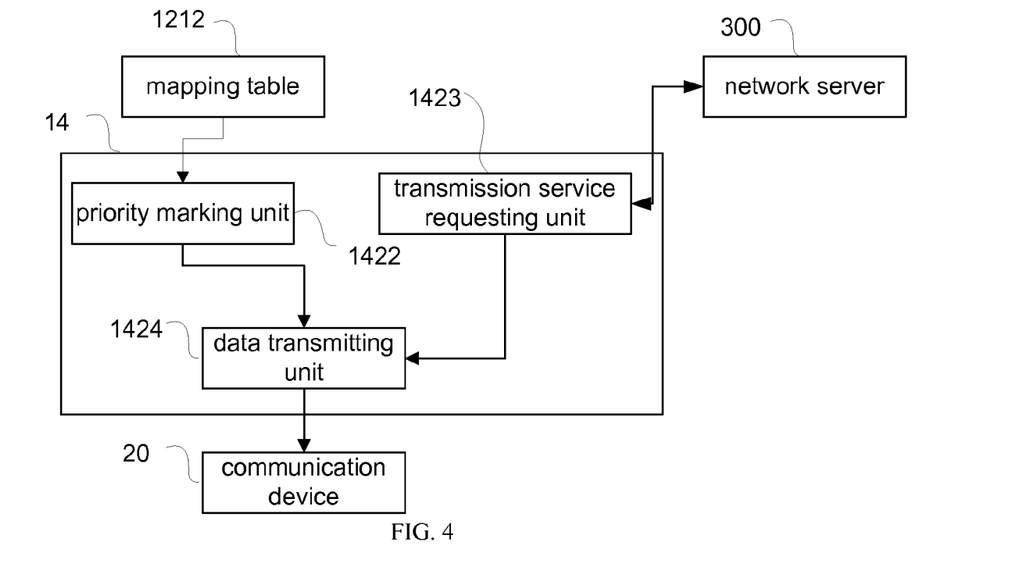
FIG. 4 shows a schematic diagram of a processor according to another embodiment.

In another embodiment, as shown in FIG. 4, the medical device may further include a mapping table 1212, pre-stored in the storage module 12, which represents the mapping relationship between network transmission service levels and priorities of the data. The processor 14 may include a priority marking unit 1422, a transmission service requesting unit 1423, and a data transmitting unit 1424. The priority marking unit 1422 assigns priorities to the data to be transmitted, according to resources or types. The transmission service requesting unit 1423 transmits transmission service requests, which could include the network transmission service level requested and corresponding network configuration parameters, to the network server 300. The data transmitting unit 1424 uses the network transmission service provided by the network server 300 to transmit the data whose priorities correspond to the network transmission service level provided. For example, the data transmitting unit 1424 transmits corresponding data to the communication device 20, and then the communication device 20 transmits the data to the remote receiver.

Figure 5:
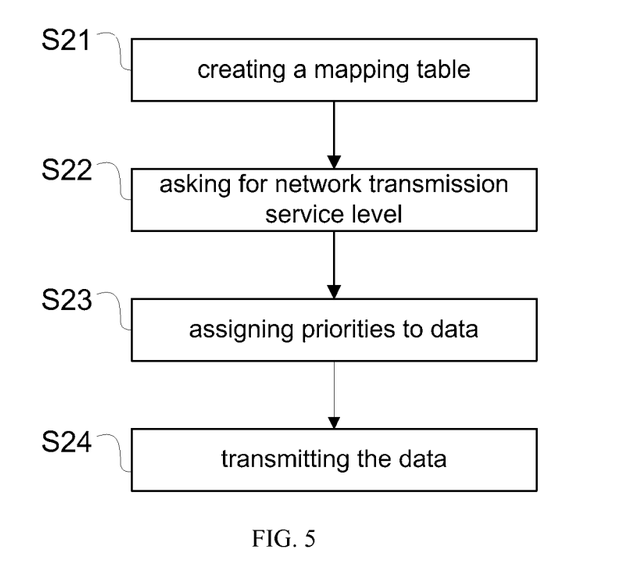
FIG. 5 shows a flow chart of a method for adjusting network transmission service level in another embodiment.

Based on the structure of the specific embodiment, the network transmission service level could be adjusted as needed during data transmission. As shown in FIG. 5, a method for adjusting the network transmission service level could include the following steps.

At step S21, the medical device creates a mapping table, which represents the mapping relationship between network transmission service levels and priorities of data. If the amount of data to be transmitted is larger, the network transmission service level needed is higher. First, the priorities of the data to be transmitted are set, and each network transmission service level may correspond to one or more priorities of the data. Consider an example in which the priorities of all the data to be transmitted are A, B, C, D, and E, from high to low, and the network transmission service levels are Level 1, Level 2, and Level 3, from low to high. According to the data transmission needed, the mapping table may map relationships such that the highest network transmission service level, Level 3, corresponds to the priorities A, B, C, D, and E; the middle network transmission service level, Level 2, corresponds to the priorities A, B, and E; and the lowest network transmission service level, Level 1, corresponds to the priorities A and B.

At step S22, a transmission service request, which could include the network transmission service level requested and corresponding network configuration parameters, is transmitted to the network server.

At step S23, the data to be transmitted is obtained in real time and assigned a priority according to its resources and types. A flag could be set in the package header or other position to mark the priority of the data. In a specific application, the data could be divided into two types: (1) the vital signs and treatment data that must always be transmitted; and (2) the audio and video data and images to be transmitted only in emergency situations. In other words, vital signs and treatment data are assigned the highest priority, and audio and video data and images are assigned the lowest priority.

At step S24, the data whose priorities correspond to the network transmission service level provided are transmitted through the network transmission service provided by the network server. The network transmission service may include at least one of bandwidth, transmission delay, and transmission channels. In one embodiment, the medical device queries the mapping table according to the network transmission service level provided to determine the priorities of data to be transmitted, and then transmits the data with corresponding priorities. Specifically, the medical device could query the flag in the package header or other position to determine the data to be transmitted, and then transmit the data determined.

In the above description, the steps S22 and S23 do not need to follow a strict sequence; the transmission service request could be transmitted first, or the data could be assigned a priority first.

In addition, the queue distributing unit 1411 of FIG. 2 and the priority marking unit 1422 of FIG. 4 could be referred to as a data pretreating unit for pretreating the data to be transmitted.

Figure 6:
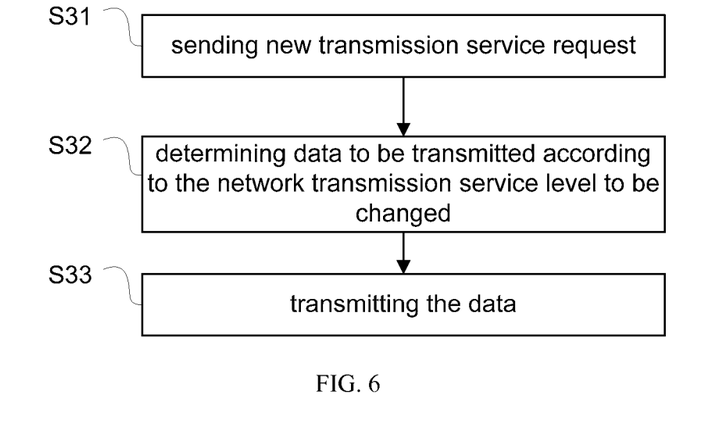
FIG. 6 shows a flow chart of a method of changing the network transmission service level in an embodiment.

There are at least two network transmission service levels. When the emergency end begins to work, it sends a transmission service request according to the network transmission service level selected by the medical worker (for example, the normal network transmission service level) and then transmits the vital signs and treatment data that correspond to the network transmission service level. When the situation changes (for example, when the medical worker needs to transmit audio and video data), the network transmission service level needs to be higher. So when the medical device detects a transmission service changing request, it generates a new transmission service request for changing the network transmission service level. As shown in FIG. 6, changing the network transmission service level may include the following steps:

At step S31, the medical device generates a new transmission service request according to a received transmission service changing request and sends it to the network server.

At step S32, the medical device determines the data to be transmitted according to the changed network transmission service level.

At step S33, the medical device transmits the data through the network transmission service provided by the network server.

At step S31, the transmission service changing request could be generated according to the input device or an event.

The data to be transmitted could be determined by querying either the mapping table representing the mapping relationship between the network transmission service levels and the priorities of the data, or the mapping table representing the mapping relationship between the network transmission service levels and the queues.

In one specific embodiment, the input device could include multiple buttons, a knob with multiple statuses, or a toggle button with multiple statuses. Each button represents one network transmission service level, and each status of the knob or toggle button represents one network transmission service level. When the medical worker presses a certain button, or turns the knob or the toggle button to a certain status, the input device generates a transmission service changing request according to the button pressed or the selected status of the knob or toggle button.

In another specific embodiment, the input device could include soft keys, such as icons, option widgets, and input widgets, set on the display interface of the medical device, each of which represents one network transmission service level. The medical worker could trigger the transmission service changing request by pressing a certain icon or selecting an option or input widget, or the medical worker could trigger the transmission service changing request by inputting a certain number or character, such as inputting 1 to select the highest network transmission service level.

The process of triggering the transmission service changing request through the input device may include the following steps: the medical worker determines the network transmission service level needed according to the current situation (for example, recognizing the importance of the event) and inputs his/her selection; the processor receives the transmission service changing request and identifies the network transmission service level to be switched to; the processor transmits identification information and the transmission service request to the network server and determines the data to be transmitted; and when the transmission service request is accepted, the data whose priority corresponds to the network transmission service level provided is transmitted.

In another specific embodiment, the processor could also include an importance recognition module. A second mapping table, which represents the mapping relationship between events and network transmission service levels, is preset. When an event is detected, the importance recognition module determines the network transmission service level corresponding to the event by querying the second mapping table. Then the processor generates the transmission service request according to the network transmission service level determined. In another embodiment, a third mapping table, which represents the mapping relationship between the importance of events and network transmission service levels, is preset. When an event is detected, the importance of the event is determined, the network transmission service level corresponding to the importance is determined by querying the third mapping table, and the appropriate transmission service request is generated and transmitted.

There are two ways to identify the importance of an event: an artificial identification and an automatic identification.

In an artificial identification, the medical worker identifies the importance of the event according to the patient's physical symptoms, and inputs the network transmission service level needed. Then the input device triggers the transmission service request according to the network transmission service level selected by the medical worker.

Alternatively, event importance could be identified automatically in ways including but not limited to the following:

1. Thresholds could be set based on measurement of vital signs, with the range of different thresholds corresponding to different importance of events.

2. The importance of the event could be set according to patient condition, which may be analyzed according to waveform data of patient vital signs collected by the medical device, such as the patient monitor and defibrillator. For example, the importance of the event could be set according to abnormal conditions of the ECG wave, such as cardiac arrest, fibrillation, atrial fibrillation, and so on.

3. The importance of the event could be set according to the status of the medical device, such as abnormal, charging, discharging, and so on.

The importance of the event corresponds to the priorities of the data or the queues. Which data needs to be transmitted depends on the importance of the event, and this also determines the network transmission service level needed. As shown in Table 1:

TABLE 1

| Importance of the event | Data to be transmitted | Network transmission service level |
|---|---|---|
| N1 | A | Level 1 |
| N2 | B | Level 2 |
| N3 | B, C, D | Level 3 |
| ... | ... | ... |

The degree of importance could be preset according to practical applications, for example:

N1 represents that the patient monitored is stable;

N2 represents an unexpected but not life-threatening abnormality; and

N3 represents that rescue is needed and the patient's life is—threatened.

In the column listing data to be transmitted, each letter could represent one or more kinds of data, for example:

A represents timing or real-time ECG report;

B represents real-time medical monitoring waveform or data;

C represents video data; and

D represents audio data.

The network transmission service levels correspond to different degrees of service provided by the network server, for example:

Level 1 corresponds to the lowest transmission service level;

Level 2 corresponds to the middle transmission service level, which could satisfy real-time and reliable transmission; and Level 3 corresponds to the highest transmission service level, which could provide special channels and wide bandwidth to allow a large amount of data to be transmitted reliably in real time.

The process of triggering a transmission service changing request may include the following steps: the importance of the event is identified automatically; the network transmission service level needed is determined by querying the third mapping table; the processor transmits the identification information and the transmission service request to the network server and determines the data that needs to be transmitted; and when the transmission service request is accepted, the data whose priority corresponds to the network transmission service level provided is transmitted.

The network server identifies the identification information received, which may include but is not limited to login username and password, data transmission card number, IMEI (International Mobile Equipment Identity) number, and device ID. After the network server has confirmed the identification information, it then determines and provides corresponding network transmission service.

The network server provides dedicated data services, different bandwidth, or transmission channels (for example, distributes backbone network or dedicated network) according to the network transmission service level requested. When the network transmission service level requested is high, the network server could provide enough bandwidth for high-speed data transmission.

When the importance of the event decreases, the network server could reduce the network transmission service according to the request, and return to normal network transmission service maintaining basic data transmission.

In one embodiment, the network server comprises a receiving unit, a network transmission service determining unit, and a service providing unit. The receiving unit receives the transmission service request transmitted by the medical device, and the transmission service request may include the network transmission service level needed. The network transmission service determining unit determines the network transmission service to provide according to the network transmission service level. The service providing unit provides the network transmission service to the medical device.

Figure 7:
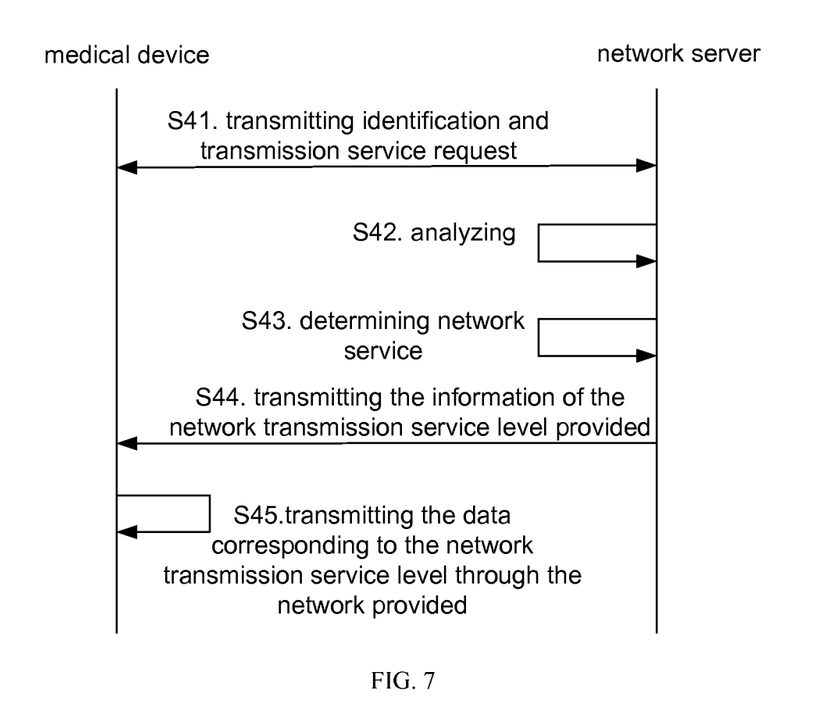
FIG. 7 shows a flow chart of an interaction between a medical device and a network server according to an embodiment.

Based on the medical device and data transmission method in one embodiment, as shown in FIG. 7, the interaction between the medical device and the network server may include the following steps:

At step S41, the operator transmits the identification information and transmission service request to the network server through the medical device. The transmission service request may include the network transmission service level needed for transmitting data.

At step S42, the network server analyzes the transmission service request received and obtains the network transmission service level needed.

At step S43, the network server determines the network transmission service according to the network transmission service level and configures the network, for example, providing appropriate bandwidth or transmission channels.

At step S44, the network server transmits information about the provided level of network transmission service to the medical device.

At step S45, the medical device transmits the data corresponding to the network transmission service level through the network transmission service provided by the network server.

In sum, in order to resolve the data transmission problems of existing prehospital emergency systems, in the embodiments described above, a transmission strategy is formulated and the network transmission service level is adjusted to fit different situations, the data transmitted is classified by importance, and the bandwidth and transmission channel provided by the network server corresponds to the network transmission service level to guarantee data transmission quality. Thus, important data can be reliably transferred with high speed, in real time and stably.

In some embodiments, the importance of the event, such as an emergency situation, could be identified by alarm information and abnormal medical parameters. Then the network transmission service level could be adjusted accordingly, and the network server could provide appropriate network transmission service. The network server could provide permanent or temporary network transmission priority for different special applications, such as emergency situations, and adjust network resource allocation dynamically to transfer a large amount of data with high speed and in real time.

In the above embodiments, the medical device of the emergency end is an example of a data terminal needing to transmit data. One of ordinary skill in the art will appreciate that the data terminal could be any other data terminal capable of adjusting network transmission levels.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, advantages, and solutions to problems have been described above with regard to various embodiments and are not to be construed as critical, required, or essential features or elements. The scope of the present disclosure should, therefore, be determined by the following claims.

What is claimed is:

1. A method for adjusting network transmission service level, used in a data terminal, comprising:
    obtaining data to be transmitted, including:
        vital signs or treatment data, and
        audio or video data images;
    inserting the data into one or more of a plurality of specified queues according to one or more data characteristics selected from importance, instantaneity, data resources, or data types, such that vital signs or treatment data are assigned a highest priority queue, and wherein audio or video data images are assigned a lower priority queue;
    generating and sending a transmission service request according to the one or more specified queues and a mapping table representing a mapping relationship between network transmission service levels and the plurality of specified queues;
    determining a network transmission service level provided by a network server;
    identifying at least one of the one or more specified queues for transmission based on the mapping table representing the mapping relationship between network transmission service levels and the plurality of specified queues; and
    using the network transmission service level provided by the network server to transmit the at least one of the one or more specified queues;
    wherein the data terminal is a medical device.

2. The method of claim 1, wherein the method further comprises;
    presetting the mapping table representing the mapping relationship between the network transmission service levels and the plurality of specified queues.

3. The method of claim 1, wherein said network transmission service level includes at least one of bandwidth, transmission delay and transmission channels.

4. The method of claim 1, wherein the method further comprises:
    generating a transmission service changing request,
    wherein said transmission service changing request is generated according to an input device;
    wherein the input device includes multiple buttons, a knob with multiple statuses or a toggle button with multiple statuses set on the data terminal, or the input device includes soft keys set on display interface of the data terminal.

5. The method of claim 4, wherein said transmission service changing request is generated by an importance recognition module;
    said importance recognition module determines the network transmission service level according to a mapping table representing the relationship between the network transmission service levels and an importance of each event.

6. The method of claim 1, wherein said data includes at least one of vital signs detected by the medical device, analysis reports, events, medical data, audio data and video data.

7. The method of claim 6, wherein the importance of the detected event is identified according to the vital signs detected by the medical device, the condition of monitored or treated patient, or the condition of the medical device.

8. A data terminal comprising:
    a data obtainer for obtaining data to be transmitted, including:
        vital signs or treatment data, and
        audio or video data images;
    a storage device for storing the data to be transmitted;
    at least one processor, connected with the data obtainer and the storage device, wherein the at least one processor is configured to:
        insert the data to be transmitted into one or more of a plurality of specified queues according to one or more data characteristics selected from importance, instantaneity, data resources, or data types, such that vital signs or treatment data are assigned a highest priority queue, and wherein audio or video data images are assigned a lower priority queue;
        generate and send a transmission service request according to the one or more specified queues and a mapping table representing a mapping relationship between network transmission service levels and the plurality of specified queues;
        determine a network transmission service level provided by a network server;
        identify at least one of the one or more specified queues for transmission based on the mapping table representing the mapping relationship between network transmission service levels and the plurality of specified queues; and
        use the network transmission service level provided by the network server to transmit the at least one of the one or more specified queues;
    wherein the data terminal is a medical device.

9. The data terminal of claim 8, wherein the storage device further stores the mapping table representing the mapping relationship between the network transmission service levels and the plurality of specified queues.

10. The data terminal of claim 8, further comprising:
    an input device for outputting a transmission service changing request according to operation of an operator,
    wherein said at least one processor is also configured to generate and send a transmission service request according to the transmission service changing request outputted by the input device.

11. The data terminal of claim 10, wherein the input device includes multiple buttons, a knob with multiple statuses or a toggle button with multiple statuses set on the data terminal, or the input device includes soft keys set on display interface of the data terminal.

12. The data terminal of claim 8, wherein the storage device further stores a relationship of the network transmission service levels and an importance of each event.

13. The data terminal of claim 8, wherein said data includes at least one of vital signs detected by the medical device, analysis reports, events, medical data, audio data and video data.

14. The data terminal of claim 13, wherein the importance of the detected event is identified according to the vital signs detected by the medical device, the condition of monitored or treated patient, or the condition of the medical device.

* * * * *